United States Patent
Gambaretto et al.

(10) Patent No.: US 10,521,970 B2
(45) Date of Patent: Dec. 31, 2019

(54) REFINING LOCAL PARAMETERIZATIONS FOR APPLYING TWO-DIMENSIONAL IMAGES TO THREE-DIMENSIONAL MODELS

(71) Applicant: Adobe Inc., San Jose, CA (US)

(72) Inventors: Emiliano Gambaretto, San Francisco, CA (US); Vladimir Kim, Seattle, WA (US); Qingnan Zhou, San Francisco, CA (US); Mehmet Ersin Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/900,864

(22) Filed: Feb. 21, 2018

(65) Prior Publication Data
US 2019/0259216 A1 Aug. 22, 2019

(51) Int. Cl.
*G06T 17/20* (2006.01)
*G06T 19/20* (2011.01)

(52) U.S. Cl.
CPC .......... *G06T 19/20* (2013.01); *G06T 17/205* (2013.01); *G06T 2219/2004* (2013.01)

(58) Field of Classification Search
CPC ........ G06T 17/205; G06T 19/20; G06T 17/30
USPC ....................................................... 345/419
See application file for complete search history.

(56) References Cited

U.S. PATENT DOCUMENTS

| | | | | |
|---|---|---|---|---|
| 6,256,038 B1* | 7/2001 | Krishnamurthy | ..... | G06T 11/203 345/419 |
| 2005/0270285 A1* | 12/2005 | Zhou | ....... | G06T 17/20 345/420 |
| 2006/0267978 A1* | 11/2006 | Litke | ....... | G06T 17/20 345/419 |
| 2011/0043613 A1* | 2/2011 | Rohaly | ........ | G06T 17/00 348/50 |
| 2013/0287294 A1* | 10/2013 | Ye | ........ | G06T 15/04 382/154 |
| 2013/0328870 A1* | 12/2013 | Grenfell | ...... | G06T 15/04 345/420 |

(Continued)

OTHER PUBLICATIONS

Schmidt, Ryan, et al., "Interactive Decal Compositing with Discrete Exponential Maps", ACM Transactions on Graphics—Proceedings of ACM Siggraph, vol. 25, Issue 3, Jul. 2006, 9 pages.

(Continued)

*Primary Examiner* — Thomas J Lett
(74) *Attorney, Agent, or Firm* — Kilpatrick Townsend & Stockton LLP

(57) ABSTRACT

Certain embodiments involve refining local parameterizations that apply two-dimensional ("2D") images to three-dimensional ("3D") models. For instance, a particular parameterization-initialization process is select based on one or more features of a target mesh region. An initial local parameterization for a 2D image is generated from this parameterization-initialization process. A quality metric for the initial local parameterization is computed, and the local parameterization is modified to improve the quality metric. The 3D model is modified by applying image points from the 2D image to the target mesh region in accordance with the modified local parameterization.

20 Claims, 3 Drawing Sheets

(56) References Cited

U.S. PATENT DOCUMENTS

2015/0351477 A1* 12/2015 Stahl ...................... G06T 15/04
700/132
2016/0012629 A1* 1/2016 Jennings ................ G06T 15/04
345/420

OTHER PUBLICATIONS

KeyShot, "KeyShot 6 Overview: 6—Applying Labels", YouTube, Feb. 25, 2016, https://www.youtube.com/watch?v=13t9e26f3TY&feature=youtu.be&hd=1&fs=1&autoplay=1&rel=0, 3 pages.

Hachman, Mark, "How to Use Microsoft's Paint 3D: Creating Cool 3 D Scenes Has Never Been So Much Fun", PCWorld, https://www.pcworld.com/article/3163631/windows/how-to-use-microsofts-paint-3d-creating-cool-3d-scenes-has-never-been-so-much-fun.html, Dec. 31, 2017, 10 pages.

Autodesk Research, "Meshmix Overview", MM Manual, https://www.mmmanual.com/meshmix-overview/, accessed Jan. 2018, 4 pages.

* cited by examiner

REFINING LOCAL PARAMETERIZATIONS FOR APPLYING TWO-DIMENSIONAL IMAGES TO THREE-DIMENSIONAL MODELS

TECHNICAL FIELD

This disclosure relates generally to computer-implemented methods and systems for computer graphics processing. Specifically, the present disclosure involves improving the quality of local parameterizations that apply two-dimensional images to three-dimensional models.

BACKGROUND

Certain graphic manipulation applications allow two-dimensional ("2D") images, such as decals, to be applied to three-dimensional ("3D") models. Applying a 2D image to a 3D model can add a desired style, texture, or other aesthetic quality to the 3D model. For instance, as depicted in FIG. 1, an image application process 106 is used to apply a 2D image 104 (e.g., a decal with the title "Soda-flavored pop!") to a 3D model 102 depicting a soda can. The image application process 106 overlays pixels from the 2D image 104 on top of the cylindrical side of the 3D model 102, resulting in a stylized 3D model 108.

Different existing techniques facilitate these types of image application processes. For instance, parameterization techniques create mappings between pixels of the 2D image and points along a mesh that defines a 3D model. These methods allow image content from a given pixel to be applied to a corresponding point along the mesh.

But existing parameterization methods presents several limitations. One limitation is quality. Some existing parameterization techniques assume an isometric map (i.e., a distortion-free map) exists between the 2D image and a target mesh region to which the 2D image is applied. But if the target mesh region cannot be flattened without distorting features of the mesh, such an isometric map does not exist and the applied 2D image includes distortions. Another example of a limitation in existing techniques is a lack of extensibility. For instance, existing parameterization techniques cannot be easily customized to specific insertion tasks, such as aligning the boundaries of a 2D image to lines or points on the 3D mesh surface. Furthermore, the computation time for existing parameterization techniques can take a long time for larger meshes, making it hard to create interactive decal-placement experiences.

Thus, existing solutions may involve disadvantages for reasons such as (but not limited to) those described above.

SUMMARY

Certain embodiments involve refining local parameterizations that apply two-dimensional ("2D") images to three-dimensional ("3D") models. For instance, a particular parameterization-initialization process is select based on one or more features of a target mesh region. An initial local parameterization for a 2D image is generated from this parameterization-initialization process. A quality metric for the initial local parameterization is computed, and the local parameterization is modified to improve the quality metric. The 3D model is modified by applying image points from the 2D image to the target mesh region in accordance with the modified local parameterization.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 2:
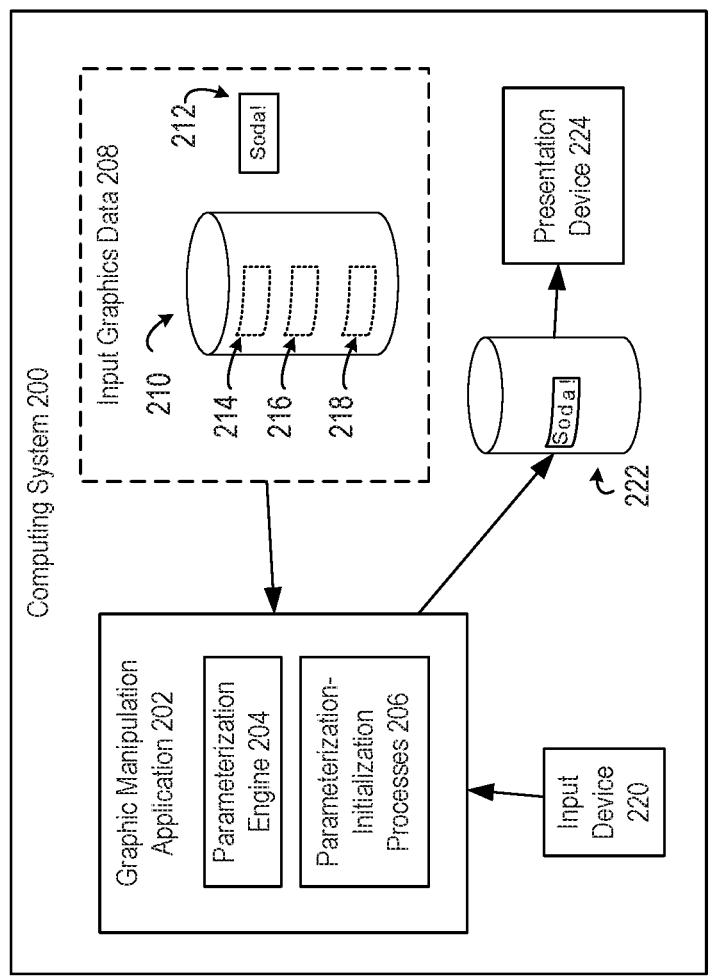
FIG. 2 depicts an example of a computing environment for improving the quality of local parameterizations that apply 2D images to 3D models, according to certain embodiments of the present disclosure.
Figure 1:
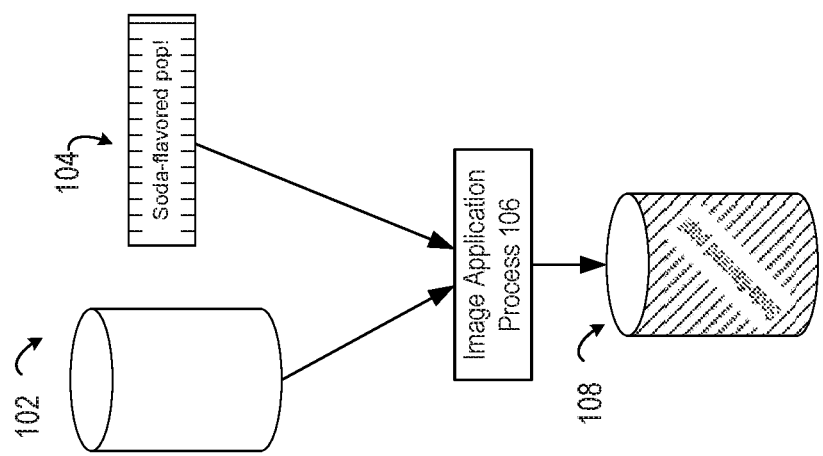
FIG. 1 depicts an example of applying a two-dimensional ("2D") image to a three-dimensional ("3D") model.

The present disclosure includes systems and methods for refining local parameterizations that are used to apply two-dimensional ("2D") images to three-dimensional ("3D") models. As discussed above, existing parameterization techniques may increase computational resources applied to a parameterization operation without achieving a desired accuracy or flexibility of the parameterization. Certain embodiments described herein can address these limitations by selecting from a variety of parameterization techniques (e.g., exponential maps, planar and cylindrical projections, etc.), each of which generates a different type of initial parameterization based on one or more characteristics of a specific mesh region. A local parameterization generated for a particular region is iteratively refined in accordance with one or more quality metrics, where the iteration can be explicitly limited by certain time budgets or other computational restrictions. Using a set of available parameterization techniques in combination with this iterative refinement can create local parameterizations that are more suitable for particular mesh regions in a computationally efficient manner.

The following non-limiting example is provided to introduce certain embodiments. In this example, a graphic manipulation application accesses a set of available parameterization-initialization processes. A parameterization-initialization process is a local parameterization technique for generating a mapping between points of a 2D image and points along a 3D surface. Examples of local parameterization techniques include an exponential map parameterization, harmonic map parameterization, planar and cylindrical projections, etc. The graphic manipulation application selects a particular parameterization-initialization process to generate an initial local parameterization for the target image and the mesh region. The graphic manipulation application makes this selection based on one or more selection criteria specific to the mesh region. In one example, the characteristics of the target mesh region are used to select the parameterization-initialization process, since certain parameterization techniques provide better results for curved surfaces and other parameterization techniques provide better results for angular surfaces. In another example, an initial quality metric is computed for each available parameterization-initialization process with respect to the target mesh region, and the graphic manipulation application selects the parameterization-initialization process resulting in the best initial quality metric.

Continuing with this example, the graphic manipulation application iteratively modifies the initially generated local parameterization to optimize the quality metric. Examples of the quality metric include one or more of a distortion value, a feature-alignment indicator, a quality score outputted by a trained machine-learning model, etc. Optimizing the quality metric could include minimizing an error function that represents distortion introduced by the mapping, errors in feature alignment for the mapping, etc. The graphic manipulation application completes the iterations based on the quality metric indicating a sufficient quality of the iteratively modified local parameterization. In some embodiments, the iteration can also be completed based on a specified time budget for the iteration (e.g., completion of the iteration before a lag is perceptible to an end user). The graphic manipulation application then applies the 2D image to the 3D model in accordance with the refined local parameterization. For instance, the graphic manipulation application overlays (or otherwise applies) image content from each pixel of the 2D image to a corresponding point on a target mesh region from the 3D model, where the corresponding point is indicated by a mapping of the refined local parameterization.

As described herein, certain embodiments provide improvements in image processing by automatically applying various rules of a particular type (e.g., local parameterizations used to apply textures or stylized features from 2D images to 3D models). In one example, using a set of different parameterization techniques can allow a more suitable parameterization to be performed with respect to a given region. For instance, if an isometric mapping likely does not exist for a particular mesh region, the graphic manipulation application described herein could use a parameterization technique that does not rely on such an isometric mapping. Furthermore, using a set of different parameterization techniques for different mesh regions that are then refined by a quality metric can increase computational efficiency, as compared to prior techniques that compute parameterizations in a greedy manner. And refining the parameterization based on a customizable quality metric allows the embodiments described herein to be customized to particular types of features in 3D models. Thus, the embodiments described herein provide improvements to computing systems that digitally apply 2D images to 3D models for purposes of texture, stylization, or other aesthetic enhancements.

Referring now to the drawings, FIG. 2 depicts an example of a computing system 200 for refining local parameterizations that are used to apply 2D images to 3D models. The computing system 200 includes one or more processing devices that execute a graphic manipulation application 202, one or more memory devices for storing graphics data that is modified or otherwise used by the graphic manipulation application 202, an input device 220 for receiving user inputs directed to the graphic manipulation application 202, and a presentation device 224 for displaying graphics data that is modified or otherwise generated by the graphic manipulation application 202.

For example, the graphic manipulation application 202 receives user input from the input device 220 indicating a desire to apply the 2D image 212 to a particular one of the mesh regions 214, 216, 218. A specific mesh region R is defined as a set of polygons, a combination of a location mesh vertex and a radius, or some other suitable definition. The user input could include, for example, a selection of a point within one of the mesh regions 214, 216, 218. The graphic manipulation application 202 generates a local parameterization having a sufficiently high quality for applying the 2D image 212 to the selected mesh region. The graphic manipulation application 202 uses a mapping in the local parameterization to match image points from the 2D image 212 (e.g., pixels of the 2D image 212) to model points along a surface of the 3D model 210 (e.g., vertices or other control points within the selected mesh region). The graphic manipulation application 202 generates a modified 3D model 222 in which the 2D image 212 is applied to the 3D model 210 in accordance with this matching operation. The graphic manipulation application 202 causes a presentation device 224 to display the modified 3D model 222.

To generate the local parameterization having a sufficiently high quality, the graphic manipulation application 202 executes a parameterization engine 204, which includes a framework for optimizing (or otherwise improving) a local parameterization for one or more mesh regions 214, 216, and 218 of a 3D model 210. The "local" nature of this parameterization results from the parameterization being focused on a particular one mesh region (e.g., mesh region 216) of a 3D model 210 rather than being applied to the entire 3D model. The local parameterization projects a texture map onto the 3D mesh region, where the axes of the texture map are denoted as u and v. In one example, the local parameterization includes a set of two floating point numbers (i.e., u and v coordinates) for each vertex of the 3D mesh that map the 2D image 212 onto one or more mesh regions of the 3D model. The 2D image 212 is applied to a particular mesh region by assigning pixels in the 2D image 212 to surface mappings on a polygon of the mesh region (e.g., by copying a triangular piece of the 2D image 212 and pasting it onto a corresponding triangle on mesh region).

The parameterization engine 204 optimizes (or otherwise improves) a local parameterization based on a quality metric. The quality metric could be, for example, a scalar value indicating the quality of a given local parameterization LP. The quality of a local parameterization includes one or more criteria indicating the degree to which the local parameterization will apply the 2D image 212 to a particular mesh region of the 3D model 210 in an aesthetically desirable manner. In some embodiments, the parameterization engine 204 includes a metric function M for computing the quality metric. Examples of different quality metrics are described herein with respect to FIG. 3.

The parameterization-initialization processes 206 include a set of different parameterization processes that can be used to generate an initial local parameterization for the particular mesh region. The graphic manipulation application 202 selects from this set of available parameterization-initialization processes 206. Selecting a particular parameterization-initialization process 206 from a set of different parameterization-initialization processes 206 can improve the quality of the local parameterization, the speed at which a high-quality parameterization is computed, or both. Examples of the parameterization-initialization processes 206 are described herein with respect to FIG. 3.

The graphic manipulation application 202 executes a refinement loop that iteratively modifies the local parameterization generated by the selected parameterization-initialization process 206. For example, the refinement loop could perform a non-linear optimization with respect to the quality metric. The refinement loop terminates based on one or more termination conditions being reached (e.g., threshold quality metric value, time budget, number of iterations, minimum progress of refinement loop, etc.). Examples of these termination conditions are described herein with respect to FIG. 3.

For illustrative purposes, FIG. 2 depicts a single computing system 200 that stores the relevant graphics data and executes the graphic manipulation application 202. In some embodiments, the single computing system 200 can be a server system or other computing devices that perform both of these functions. But other implementations are possible. For instance, a computing system 200 could include different computing devices (or groups of devices), each of which performs one or more of training various machine-learning models used by the graphic manipulation application 202, executing the graphic manipulation application 202, storing the input graphics data 208, and presenting the modified 3D model 222 on a presentation device.

Figure 3:
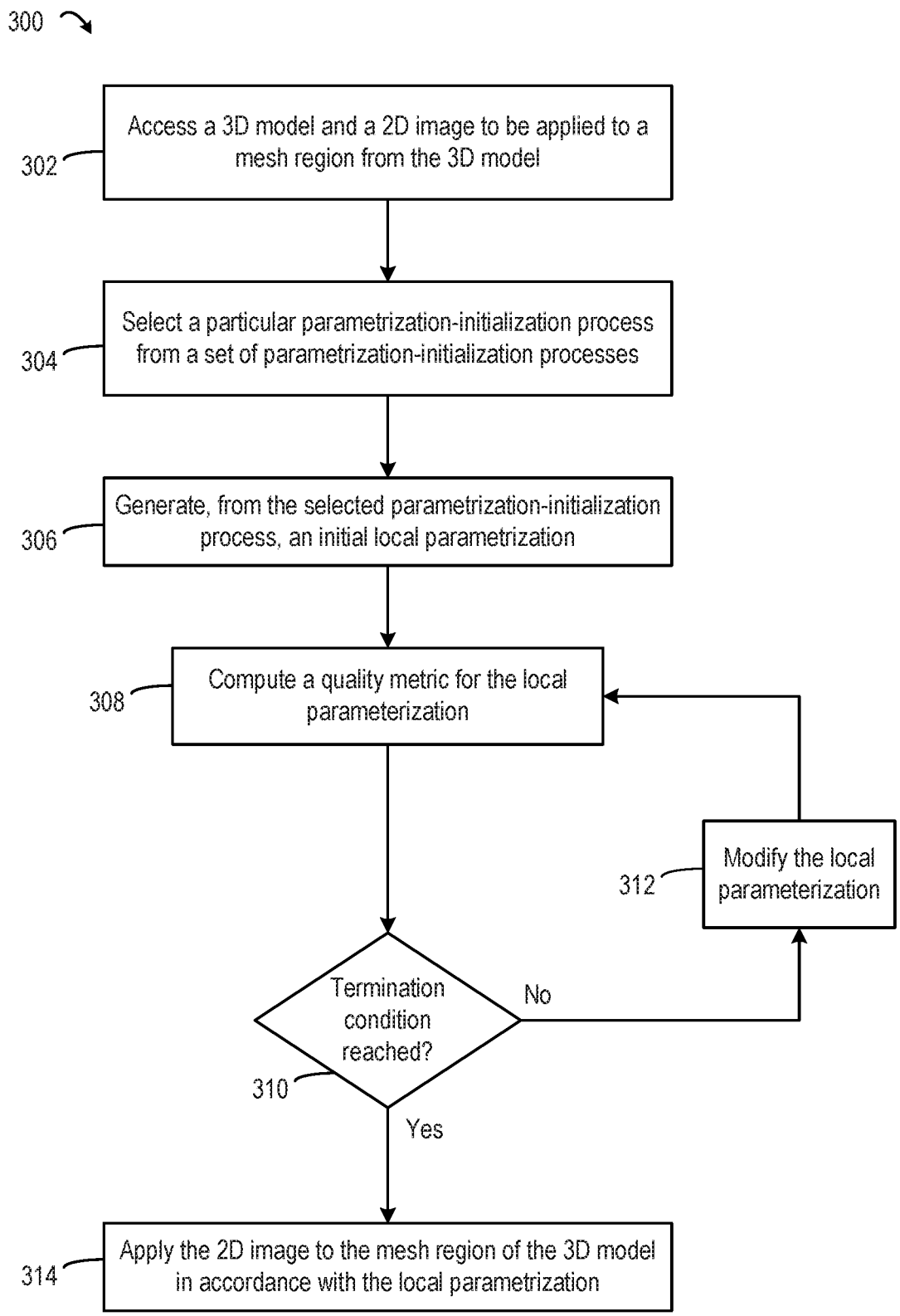
FIG. 3 depicts an example of a process for iteratively computing local parameterizations used to apply 2D images to 3D models, according to certain embodiments of the present disclosure.

FIG. 3 depicts an example of a process 300 for computing high-quality local parameterizations used in applying 2D images to 3D models. One or more computing devices (e.g., the computing system 200) implement operations depicted in FIG. 3 by executing suitable program code (e.g., the graphics manipulation application 202). For illustrative purposes, the process 300 is described with reference to certain examples depicted in the figures. Other implementations, however, are possible.

At block 302, the process 300 involves accessing a 3D model and a 2D image to be applied to a mesh region from the 3D model. One or more computing devices execute program code from the graphics manipulation application 202 to implement block 302. For instance, the parameterization engine 204 accesses, from input graphics data 208, a 3D model 210 and a 2D image 212. In some embodiments, the parameterization engine 204 accesses the input graphics data 208 by communicating, via a data bus, suitable signals between a local non-transitory computer-readable medium (e.g., a memory device storing the input graphics data 208) and a local processing device included in the same computing device as the memory. In additional or alternative embodiments, the parameterization engine 204 accesses the input graphics data 208 by communicating, via a data network, suitable signals between a computing device that includes the non-transitory computer-readable medium and a computing device that includes the processing device at which the graphic manipulation application 202 is executed.

At block 304, the process 300 involves selecting a particular parameterization-initialization process from a set of parameterization-initialization processes. One or more computing devices execute program code from the graphics manipulation application 202 to implement block 304. For instance, the parameterization engine 204 accesses program code corresponding to various parameterization-initialization processes 206 and determines which of the parameterization-initialization processes 206 is suitable for a target mesh region. In some embodiments, the parameterization engine 204 determines the most suitable parameterization-initialization process 206 by computing an initial quality metric for each parameterization technique and choosing the parameterization technique with the best initial quality metric. In additional or alternative embodiments, the parameterization engine 204 computes or otherwise accesses data describing one or more features (e.g., morphology, feature type, etc.) of the target mesh region. The parameterization engine 204 accesses configuration data indicating which parameterization technique is associated with the identified features of the target mesh region and selects that parameterization technique.

One example of a parameterization-initialization process 206 is an exponential map parameterization. The exponential map parameterization creates a local parameterization of the particular mesh region 216 to which a 2D image will be applied. To do so, the exponential map parameterization computes a local parameterization centered around a particular point on the 3D model 210, such as a point selected by a user input to the graphic manipulation application 202. The exponential map parameterization expands outward from the particular point in a greedy manner. For instance, the exponential map parameterization iteratively flattens local neighborhoods of a plane on a triangle-by-triangle basis. Once the exponential map parameterization has the flattened neighborhood mapped to a local 3D mesh region, the exponential map parameterization translates the 2D image 212 onto the flatted plane of the 3D surface. Distortions in the image-application process are minimized or otherwise reduced by preserving the relative distances between pixels in the 2D image 212 prior to being applied to the particular mesh region 216 and corresponding distances between the pixels after being applied to the particular mesh region 216 (i.e., being mapped to the surface of the mesh). An example of implementing an exponential map parameterization is described in Schmidt et al., "Interactive Decal Compositing with Discrete Exponential Maps," *CM Transactions on Graphics*, 25(3), July 2006, pp. 605-613, which is incorporated by reference herein.

Another example of the parameterization-initialization processes 206 is a harmonic map parameterization. The harmonic map parameterization decomposes the 3D model 210 into patches. Boundaries of the patches correspond to boundaries of features on the 3D model 210. For example, if the 3D model 210 depicts a face having a "nose" feature, a boundary of the nose will correspond to a boundary of a patch that is computed by the harmonic map parameterization. The harmonic map parameterization computes a local parameterization by snapping one or more patch boundaries to one or more boundaries of the 2D image 212. For instance, the harmonic map parameterization flattens a given patch obtained from the 3D model 210 into a 2D plane. The harmonic map parameterization maps one or more portions of the 2D image 212 onto this 2D plane by aligning the 2D image 212 with the boundary of the patch that defines the 2D plane. The harmonic map parameterization could be used for snapping salient features of a 3D model 210 to boundaries of a 2D image 212.

Another example of the parameterization-initialization processes 206 is a neighboring local parameterization from another point along the 3D model 210. The graphic manipulation application 202 accesses given mesh regions $R_1$, $R_2$, . . . , $R_N$ and previously computed local parameterizations of these regions $LP(R_i)$. The existing local parameterizations $LP(R_i)$ have been previously computed by the graphic manipulation application 202 in response to a placement input received by the graphic manipulation application 202 with respect to the 2D image. Assuming that a displaced mesh region R' overlaps with some of the mesh regions $R_i$, the graphic manipulation application 202 computes the parameterization LP (R') of the mesh region R' by adjusting the original parameterizations $LP(R_i)$, rather than re-computing LP (R') from scratch.

For instance, if the graphic manipulation application 202 has been previously used to place the 2D image 212 (or another image) onto the 3D model 210 at a first point along the surface of the 3D model 210, the graphic manipulation application 202 would have previously computed a local parameterization for a mesh region 214 associated with that first point. In a subsequent image-application process, the graphic manipulation application 202 identifies a second point at which the 2D image 212 is to be placed (e.g., because a user has decided to shift the placement of a decal or other 2D image 212). The first point can be located in a different mesh region that overlaps or neighbors the target mesh region in which the second point is located. A neighboring region can be a region that is within a threshold distance of another region. In some embodiments, a neighboring local parameterization is selected based on the neighboring region having a morphology similar to the target region (e.g., both regions being classified as the same feature or type of feature, both regions having similar levels of curviness or lack thereof, etc.).

To compute the local parameterization with respect to the mesh region 216 associated with the second point, the graphic manipulation application 202 retrieves the local parameterization for the first mesh region 214 and adjusts one or more values of the corresponding local parameterization to create the local parameterization with respect to the second mesh region 216. In a simplified example, if the second point is at a position a few pixels to the left of the first point, the graphic manipulation application 202 translates values in the local parameterization for the first point to adjust for the shift in position. In another example, a target point A (i.e., a new point selected by a user input) along the 3D model may have neighboring points B, C, D, and E with associated local parameterizations LP(B), LP(C),LP(D), and LP(E). The LP(A) could be computed as a weighted average of LP(B), LP(C),LP(D), and LP(E).

Another example of the parameterization-initialization processes 206 is a user-provided parameterization. For example, an artist or other uses could provide a template or default parameterization for the 3D model 210 along with the 3D model 210. The graphic manipulation application 202 can access the template or default parameterization from a data structure in which the 3D model 210 is stored.

In some embodiments, the graphic manipulation application 202 selects a particular parameterization-initialization process from the set of parameterization-initialization processes based on the quality metric M. For example, the graphic manipulation application 202 computes a set of initial local parameterizations, where each of these initial local parameterizations is computed using a different one of the parameterization-initialization processes. The graphic manipulation application 202 computes initial values of the quality metric for these initial local parameterizations, respectively. The graphic manipulation application 202 selects the initial local parameterization having the best value for the quality metric (e.g., the highest value or value indicating the best quality local parameterization). The graphic manipulation application 202 iteratively adjusts the selected local parameterization.

In additional or alternative embodiments, the graphic manipulation application 202 selects a particular parameterization-initialization process from the set of parameterization-initialization processes based on a morphology of the particular mesh region 216. In one example, the graphic manipulation application 202 could determine that the mesh region 216 includes more curviness, and therefore includes fewer pronounced 3D features. The lack of pronounced 3D features could reduce the need to align the 2D image 212 with a particular feature boundary. Therefore, the graphic manipulation application 202 could select the exponential map parameterization. In another example, the graphic manipulation application 202 could determine that the mesh region 216 includes more sharp angles or other pronounced 3D features. The nature of these features could indicate that the patch-based decomposition of the harmonic map parameterization is suitable. Therefore, the graphic manipulation application 202 could select the harmonic map parameterization.

Some of the parameterization techniques described above can be used for target mesh regions having a non-trivial curvature or changes in curvature across the mesh region (i.e., a non-constant curvature). But the parameterization engine 204 can also use other techniques. For instance, in some embodiments, the parameterization engine 204 uses projection-based techniques (i.e., simply projecting a 2D image onto a plane or curved surface) if doing so would be acceptable for the target mesh region's morphology. In one example, the parameterization engine 204 determines, from an analysis of a target mesh region's morphology, whether the target mesh region has a trivial or constant curvature (e.g., a flat, cylindrical, or spherical curvature). If the parameterization engine 204 detects a trivial or constant curvature in the target mesh region, the parameterization engine 204 can use simpler parameterization techniques, such as the projection of the 2D image onto the planar or constantly curved surface, that are more efficient than the exponential or harmonic map parameterization. Increased efficiency in computing a parameterization can include one or more of lower distortion and less computation time.

The graphic manipulation application 202 can determine the morphology of a mesh region in any suitable manner. In some embodiments, the graphic manipulation application 202 analyzes information about the mesh region 216 (e.g., curvature, number of vertices, etc.) to determine the morphology of the region. In other embodiments, the graphic manipulation application 202 applies a feature-classification model (e.g., a machine-learning model) that is trained to classify the 3D model 210. The classification of the 3D model 210 (or individual features) using the feature-classification model could indicate the morphology of the 3D model 210. For instance, if the feature-classification model indicates that the 3D model 210 depicts a bottle, the graphic manipulation application 202 could determine from this classification that the morphology of the 3D model 210 includes a larger degree of curviness, and therefore that the exponential map parameterization should be used.

In one example, the graphic manipulation application 202 could compute various different local parameterizations in response to the 2D image 212 being moved, in accordance with user input, to different positions on the 3D model 210. In this case, the graphic manipulation application 202 could compute the local parameterization for a given point by adjusting an existing local parameterization for a neighboring point. Doing so could result in a faster computation of the local parameterization for the given point as compared to using the exponential map parameterization or the harmonic map parameterization.

At block 306, the process 300 involves generating, from the selected parameterization-initialization process, an initial local parameterization. One or more computing devices execute program code from the graphics manipulation application 202 to implement block 306. For instance, the parameterization engine 204 retrieves program code for the parameterization-initialization process 206 selected at block 304 and executes this retrieved program code, using the 2D image 212 and the targeted mesh region of the 3D model 210 as inputs. Executing the program code generates a local parameterization that includes a mapping of image points from the 2D image 212 to model points (e.g., vertices or other control points) along a surface of the target mesh region.

At block 308, the process 300 involves computing a quality metric for the local parameterization. One or more computing devices execute program code from the graphics manipulation application 202 to implement block 308. For example, the parameterization engine 204 applies one or more metric functions to the local parameterization. A metric function includes one or more operations for computing a scalar value indicating a quality of the local parameterization. In some embodiments, the parameterization engine 204 computes the quality metric at block 308 by computing various interim quality metrics (e.g., distortion, feature-alignment, etc.) and combining the interim quality metrics (e.g., via a weighted average, a linear combination, or some other mathematical formula that receives the interim quality metrics as inputs and computes a combined quality metric as an output).

One example of a quality metric is a distortion metric. The distortion metric indicates the degree to which one or more features of the 2D image 212 will be modified (e.g., stretched, compressed, etc.) by applying the 2D image 212 to the target mesh region using the local parameterization. In one example, the 2D image 212 depicts a circle that is modified when applying the 2D image 212 to the target mesh region. A local parameterization that slightly modifies the circle (e.g., turning the circle into an oval) will have a higher distortion metric than a local parameterization that greatly modifies the circle (e.g., turning the circle into a square).

Any suitable function can be used for computing a distortion metric. An example of a metric function for computing a distortion metric E is:

$$E = \frac{1}{A}\sum_{f} A_f e^{(-d_f^2/\sigma^2)}. \quad (1)$$

The distortion metric from this metric function can have a range of [0 . . . 1]. This distortion metric could measure, for example, a fraction of a 3D surface that was acceptably parameterized. In this metric function, A is a mesh area for a target mesh region, $\tau_f()$ is a sum with respect to all faces in the target mesh region mesh, $A_f$ is a face area for a given face in the mesh region, $d_f$ is a per-face distortion error, and $\sigma$ is an error tolerance. An example of a per-face distortion error is a symmetric Dirichlet energy $E_D$ for the face f, which can be provided by the following function:

$$E_D(f) = \frac{1}{2}f\|\text{grad}\,f\|^2. \quad (2)$$

The error tolerance can indicate an acceptable amount of distortion for the 2D image and the target mesh region. For instance, a higher value of the error tolerance could indicate that a larger amount of distortion (i.e., how much a triangle can scale or stretch relative to neighboring triangles) is acceptable for a particular image-to-mesh application.

Another example of a quality metric is a feature alignment metric. The feature alignment metric could measure how closely one or more edges depicted in the 2D image 212 are aligned with one or more edges of the target mesh region. A smaller distance between an edge on an image feature and an edge on a feature from the mesh region (i.e., a model feature) could indicate a better quality metric. A larger distance between an edge on an image feature and an edge on a feature from the mesh region (i.e., a model feature) indicates a worse quality metric.

In some embodiments, the feature alignment metric is computed using Equation (1) for a set of harmonic maps that map the 3D surface of the target mesh region to a rectangle from the 2D image. The parameterization engine 204 creates a set of these maps by mapping four points on the 3D region boundary to four corners of a rectangle from the 2D image. The parameterization engine 204 selects, from this set of maps, a particular map minimizes error E from Equation 1. This minimized value of E is selected as the feature alignment metric.

Another example of a quality metric is a learned quality metric computed with a trained machine-learning model. A quality machine-learning model could be trained to associate various parameterizations with quality scores. For instance, training data used in this training process could include a set of artist-labelled quality scores corresponding to a set of meshes and local parameterizations, where artists or other users have reviewed the results of applying 2D images to the meshes using the local parameterizations and have assigned quality scores to the results. Additionally or alternatively, training data used in this training process could include a set of artist-created local parameterizations.

In some embodiments, using a learned quality metric can allow for a more nuanced selection of a particular parameterization-initialization process, a refinement of the initial local parameterization, or both. For instance, particular shapes may have features that hide or obscure certain distortions introduced by applying a 2D image 212. In one example, if a 3D model 210 depicts a head to which a "face" image will be applied, and any distortions at the back of the head will eventually be hidden by applying a separate "hair" image, then distortions that occur at the back of the head can be ignored or relaxed in the quality metric. Thus, the parameterization engine 204 can focus the parameterization-optimization on facial features.

Another example of a quality metric is a developer-defined quality metric. For example, the graphic manipulation application 202 could provide an interface for receiving user input (e.g., from a developer or other user) that selects a certain metric function M, defines metric function M, or otherwise allows a developer to provide a customized quality metric.

At block 310, the process 300 involves determining whether a termination condition has been reached. One or more computing devices execute program code from the graphics manipulation application 202 to implement block 310. For instance, the parameterization engine 204 executes a refinement loop (e.g., blocks 308-312) that iteratively modifies the local parameterization generated by the selected parameterization-initialization process. This iterative refinement can terminate based on one or more termination conditions. One example of a termination condition is the quality metric being optimized (e.g., minimizing an error value, exceeding a threshold quality value, etc.). Another example of a termination condition is a time budget or iteration count being reached. For instance, the graphic manipulation application 202 could access a threshold duration (e.g., maximum amount of time or maximum number of iterations) for the refinement loop. The maximum amount of time or maximum number of iterations could be selected such that the computation of the local parameterization is transparent to a user. For instance, a time budget of tens of milliseconds could prevent a user from noticing a lag between a user input placing the 2D image 212 at a certain point and the local parameterization being completed. Additionally or alternatively, a different time budget (e.g., half a second) could be used on a "mouse up" command. Another example of a termination condition is a minimum progress (e.g., change in the quality metric) over a given number of previous iterations.

If a termination condition has not been reached, the process 300 involves modifying the local parameterization, as depicted at block 312. One or more computing devices execute program code from the graphics manipulation application 202 to implement block 312. In some embodiments, the parameterization engine 204 could perform a non-linear optimization with respect to the quality metric. This non-linear optimization involves, for example, modifying (u, v) coordinates of triangles in the mapping to minimize an error value used in the quality metric. In one example, the parameterization engine 204 could minimize a metric function M, which could be a computation of a single E using Equation (1) or another scalar value derived Equation 1, such as a weighted combination of a distortion metric computed using Equation (1) and (2), a feature alignment metric computed as described above with respect to block 308, and any other suitable error values. In another example, the parameterization engine 204 could maximize a scalar value representing quality, such as a scalar value outputted by a machine-learning model that is trained to compute a quality metric, as described above.

If a termination condition has been reached, the process 300 involves applying the 2D image to the mesh region of the 3D model in accordance with the local parameterization, as depicted at block 314. One or more computing devices execute program code from the graphics manipulation application 202 to implement block 314.

In some embodiments, the graphic manipulation application 202 causes a presentation device 224 to display the modified 3D model 222 to which the 2D image 212 has been applied. In some embodiments, the graphic manipulation application 202 accesses the modified 3D model 222 from a local non-transitory computer-readable medium and communicates, via a data bus, suitable signals to the presentation device 224 (e.g., display data, rendering instructions, etc.). In additional or alternative embodiments, the graphic manipulation application 202 accesses the modified 3D model 222 from a suitable non-transitory computer-readable medium (e.g., a local or network-accessible memory device) and transmits suitable signals to a remote computing device via a data network. The suitable signals can include display data, rendering instructions, or other messages that instruct or otherwise cause the remote computing device to render the display data at the presentation device 224.

In some embodiments, the graphic manipulation application 202 enhances the process 300 by applying one or more operations described above to a low-resolution version of a mesh from the 3D model 210. For example, the 3D model 210 could include a high-resolution mesh having a large number of vertices. The graphic manipulation application 202 or other suitable engine generates a low-resolution version of the 3D model 210 by down-sampling this mesh, resulting in a low-resolution mesh with a smaller number of vertices. (The terms "high-resolution" and "low-resolution" can encompass any relationship in which a first mesh with a higher resolution is down-sampled into a mesh with a lower resolution.) The down-sampling can be performed such that salient features present in the high-resolution mesh (e.g., facial features in a 3D model 210 depicting a head) are also present in the low-resolution mesh. The down-sampling can also be performed such that distortions are not introduced in the low-resolution mesh.

In these embodiments, the graphic manipulation application 202 computes, with one or more operations of the process 300, a sufficiently high-quality local parameterization for a mesh region from the low-resolution mesh. The graphic manipulation application 202 converts this local parameterization into a local parameterization for the high-resolution mesh via a suitable mapping from the low-resolution mesh to the high-resolution mesh. The graphic manipulation application 202 modifies the 3D model 210 by applying the 2D image 212 to the 3D model 210 in accordance with local parameterization for the high-resolution mesh.

Figure 4:
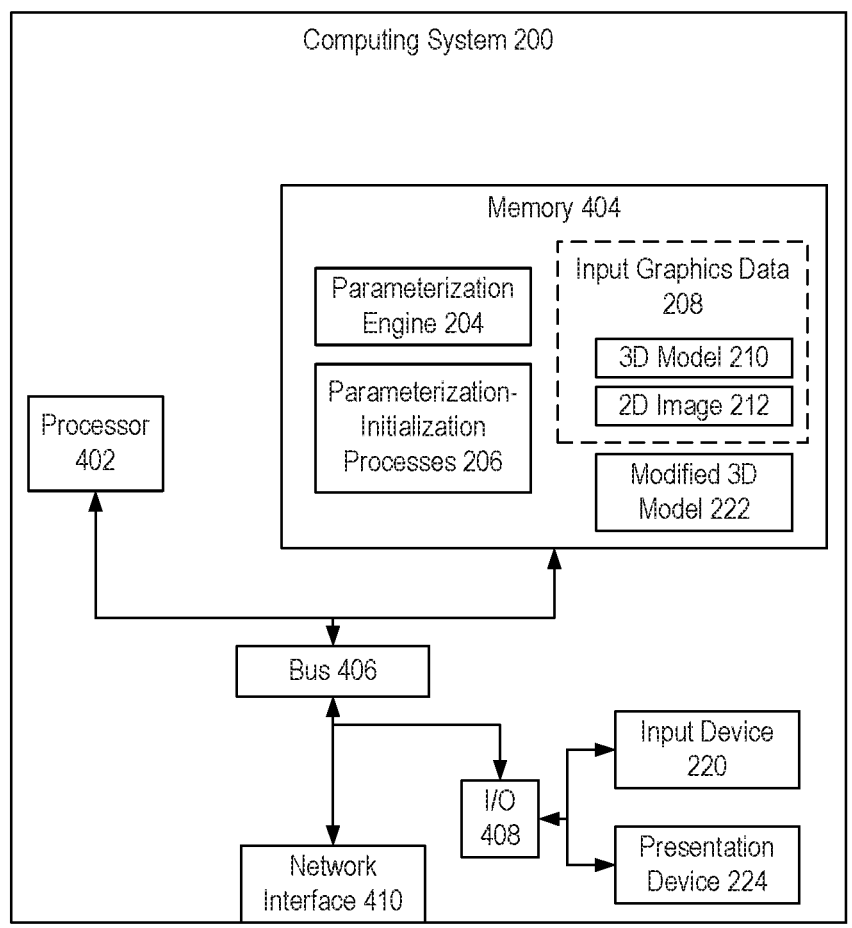
FIG. 4 depicts an example of an implementation of the computing system of FIG. 2, according to certain embodiments of the present disclosure.

Any suitable computing system or group of computing systems can be used for performing the operations described herein. For example, FIG. 4 depicts an example of a computing system 200. In some embodiments, the computing system 200 includes a processing device that executes the graphics manipulation application 202, a memory that stores various graphics data, an input device 220 (e.g., a mouse, a keyboard, a touchpad, a touchscreen, etc.), and a presentation device 224 that displays graphical content (e.g., the 3D model 210, the 2D image 212, the modified 3D model 222), as depicted in FIG. 4. In other embodiments, different computing systems having devices similar to those depicted in FIG. 4 (e.g., a processor, a memory, etc.) perform one or more of executing the graphics manipulation application 202, storing the graphics data, receiving input, and displaying the various outputs.

The depicted example of a computing system 200 includes a processor 402 communicatively coupled to one or more memory devices 404. The processor 402 executes computer-executable program code stored in a memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including a single processing device.

The memory device 404 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 200 may also include a number of external or internal devices, such as input device 220, a presentation device 224, or other input or output devices. For example, the computing system 200 is shown with one or more input/output ("I/O") interfaces 408. An I/O interface 408 can receive input from input devices or provide output to output devices. One or more buses 406 are also included in the computing system 200. The bus 406 communicatively couples one or more components of a respective one of the computing system 200.

The computing system 200 executes program code that configures the processor 402 to perform one or more of the operations described herein. The program code includes, for example, the graphics manipulation application 202 or other suitable applications that perform one or more operations described herein. The program code may be resident in the memory device 404 or any suitable computer-readable medium and may be executed by the processor 402 or any other suitable processor. In some embodiments, all modules in the graphics manipulation application 202 (e.g., the parameterization engine 204, the parameterization-initialization processes 206, etc.) are stored in the memory device 404, as depicted in FIG. 4. In additional or alternative embodiments, one or more of these modules from the graphics manipulation application 202 are stored in different memory devices of different computing systems.

In some embodiments, the computing system 200 also includes a network interface device 410. The network interface device 410 includes any device or group of devices suitable for establishing a wired or wireless data connection to one or more data networks. Non-limiting examples of the network interface device 410 include an Ethernet network adapter, a modem, and/or the like. The computing system 200 is able to communicate with one or more other computing devices (e.g., a computing device executing a graphics manipulation application 202) via a data network using the network interface device 410.

In some embodiments, the computing system 200 also includes the input device 220 and the presentation device 224 depicted in FIG. 4. An input device 220 can include any device or group of devices suitable for receiving visual, auditory, or other suitable input that controls or affects the operations of the processor 402. Non-limiting examples of the input device 220 include a touchscreen, a mouse, a keyboard, a microphone, a separate mobile computing device, etc. A presentation device 224 can include any device or group of devices suitable for providing visual, auditory, or other suitable sensory output. Non-limiting examples of the presentation device 224 include a touchscreen, a monitor, a speaker, a separate mobile computing device, etc.

Although FIG. 4 depicts the input device 220 and the presentation device 224 as being local to the computing device that executes the graphic manipulation application 202, other implementations are possible. For instance, in some embodiments, one or more of the input device 220 and the presentation device 224 can include a remote client-computing device that communicates with the computing system 200 via the network interface device 410 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for refining local parameterizations that apply two-dimensional ("2D") images to three-dimensional ("3D") models, wherein the method includes one or more processing devices performing operations comprising:
   selecting, from a set of parameterization-initialization processes, a particular parameterization-initialization process based on one or more features of a target mesh region of a 3D model;
   generating, from the particular parameterization-initialization process, an initial local parameterization comprising a mapping of image points from a 2D image to model points along a surface of the target mesh region;
   computing an initial value for a quality metric indicating a quality of the initial local parameterization;
   generating a modified local parameterization by changing the mapping from the initial local parameterization;
   computing a modified value for the quality metric indicating a quality of the modified local parameterization; and
   modifying the 3D model by applying the image points to the model points in accordance with the modified local parameterization.

2. The method of claim 1, wherein the set of parameterization-initialization processes comprises an exponential map parameterization, a harmonic map parameterization, and a prior parameterization for a different mesh region of the 3D model that neighbors or overlaps the target mesh region.

3. The method of claim 2, wherein selecting the particular parameterization-initialization process based on the one or more features of the target mesh region comprises selecting the exponential map parameterization based on a curviness of the target mesh region.

4. The method of claim 2, wherein selecting the particular parameterization-initialization process based on the one or more features of the target mesh region comprises selecting the harmonic map parameterization based on a lack of curviness of the target mesh region.

5. The method of claim 2, wherein selecting the particular parameterization-initialization process based on the one or more features of the target mesh region comprises selecting the prior parameterization based on the target mesh region having a morphology similar to the different mesh region, wherein generating the initial local parameterization comprises adjusting a prior mapping between the 2D image and the different mesh region.

6. The method of claim 1, wherein the quality metric indicates an amount of distortion in the 2D image as applied to the target mesh region via a local parameterization.

7. The method of claim 1, wherein the quality metric indicates an amount of alignment between a feature of the 2D image and a feature of the target mesh region having the 2D image applied via a local parameterization.

8. The method of claim 1, wherein generating the modified local parameterization comprises performing an iterative refinement of the mapping from the initial local parameterization, wherein the iterative refinement is terminated based on one or more of:
  (i) the quality metric indicating a minimum error in the mapping;
  (ii) the iterative refinement reaching a threshold duration or number of iterations; or
  (iii) a minimum progress in the iterative refinement.

9. A system comprising:
  a processing device; and
  a non-transitory computer-readable medium communicatively coupled to the processing device, wherein the processing device is configured to execute program code stored in the non-transitory computer-readable medium and thereby perform operations comprising:
    selecting, from a set of parameterization-initialization processes, a particular parameterization-initialization process based on one or more features of a target mesh region of a three-dimensional ("3D") model, wherein the set of parameterization-initialization processes comprises an exponential map parameterization, a harmonic map parameterization, and a prior parameterization for a different mesh region of the 3D that neighbors or overlaps the target mesh region,
    generating, from the particular parameterization-initialization process, an initial local parameterization comprising a mapping of image points from a two-dimensional ("2D") image to model points along a surface of the target mesh region,
    computing an initial value for a quality metric indicating a quality of the initial local parameterization,
    generating a modified local parameterization by changing the mapping from the initial local parameterization,
    computing a modified value for the quality metric indicating a quality of the modified local parameterization, and
    modifying the 3D model by applying the image points to the model points in accordance with the modified local parameterization.

10. The system of claim 9, wherein selecting the particular parameterization-initialization process based on the one or more features of the target mesh region comprises selecting the exponential map parameterization based on a curviness of the target mesh region.

11. The system of claim 9, wherein selecting the particular parameterization-initialization process based on the one or more features of the target mesh region comprises selecting the harmonic map parameterization based on a lack of curviness of the target mesh region.

12. The system of claim 9, wherein selecting the particular parameterization-initialization process based on the one or more features of the target mesh region comprises selecting the prior parameterization based on the target mesh region having a morphology similar to the different mesh region, wherein generating the initial local parameterization comprises adjusting a prior mapping between the 2D image and the different mesh region.

13. The system of claim 9, wherein the quality metric indicates an amount of distortion in the 2D image as applied to the target mesh region via a local parameterization and an amount of alignment between a feature of the 2D image and a feature of the target mesh region having the 2D image applied via a local parameterization.

14. The system of claim 9, wherein generating the modified local parameterization comprises performing an iterative refinement of the mapping from the initial local parameterization, wherein the iterative refinement is terminated based on one or more of:
  (i) the quality metric indicating a minimum error in the mapping;
  (ii) the iterative refinement reaching a threshold duration or number of iterations; or
  (iii) a minimum progress in the iterative refinement.

15. A non-transitory computer-readable medium having program code that is stored thereon, wherein the program code, when executed by one or more processing devices, causes the one or more processing devices to perform operations comprising:
  selecting, from a set of parameterization-initialization processes, a particular parameterization-initialization process based on one or more features of a target mesh region of a three-dimensional ("3D") model;
  a step for generating, from the particular parameterization-initialization process, an initial local parameterization comprising a mapping of image points from a two-dimensional ("2D") image to model points along a surface of the target mesh region;
  a step for computing an initial value for a quality metric indicating a quality of the initial local parameterization;
  generating a modified local parameterization by changing the mapping from the initial local parameterization;
  a step for computing a modified value for the quality metric indicating a quality of the modified local parameterization; and
  modifying the 3D model by applying the image points to the model points in accordance with the modified local parameterization.

16. The non-transitory computer-readable medium of claim 15, wherein the set of parameterization-initialization processes comprises an exponential map parameterization, a harmonic map parameterization, and a prior parameterization for a different mesh region of the 3D model that neighbors or overlaps the target mesh region.

17. The non-transitory computer-readable medium of claim 16, wherein selecting the particular parameterization-initialization process based on the one or more features of the target mesh region comprises selecting the exponential map parameterization based on a curviness of the target mesh region.

18. The non-transitory computer-readable medium of claim 16, wherein selecting the particular parameterization-initialization process based on the one or more features of the target mesh region comprises selecting the harmonic map parameterization based on a lack of curviness of the target mesh region.

19. The non-transitory computer-readable medium of claim 16, wherein selecting the particular parameterization-initialization process based on the one or more features of the target mesh region comprises selecting the prior parameterization based on the target mesh region having a morphology similar to the different mesh region, wherein generating the initial local parameterization comprises adjusting a prior mapping between the 2D image and the different mesh region.

20. The non-transitory computer-readable medium of claim 15, wherein the quality metric indicates one or more of:
   an amount of distortion in the 2D image as applied to the target mesh region via a local parameterization; and
   an amount of alignment between a feature of the 2D image and a feature of the target mesh region having the 2D image applied via a local parameterization.

* * * * *